United States Patent [19]
Takahashi et al.

[11] 3,797,834
[45] Mar. 19, 1974

[54] RECORD-PLAYER FOR CONTINUOUS PLAY

[75] Inventors: Yoshio Takahashi; Kunio Abe; Toyonori Igata, all of Shizuoka, Japan

[73] Assignee: Pioneer Electronic Corporation, Tokyo, Japan

[22] Filed: Dec. 29, 1971

[21] Appl. No.: 213,602

[30] Foreign Application Priority Data
Dec. 30, 1970 Japan ............................ 45-127171

[52] U.S. Cl. ............................ 274/10 R, 274/10 S
[51] Int. Cl. ..................... G11b 17/04, G11b 17/12
[58] Field of Search ......................... 274/10 R, 10 S

[56] References Cited

UNITED STATES PATENTS

| | | | |
|---|---|---|---|
| 3,288,471 | 11/1966 | Weedfall | 274/10 S |
| 3,201,130 | 8/1965 | Morrison et al. | 274/10 S |
| 3,697,087 | 10/1972 | Takahashi | 274/10 R |
| 3,534,967 | 10/1970 | Freier | 274/10 R |
| 3,438,636 | 4/1969 | Carlson | 274/10 R |

*Primary Examiner*—Louis R. Prince
*Assistant Examiner*—Steven L. Stephan
*Attorney, Agent, or Firm*—Sughrue, Rothwell, Mion, Zinn and Macpeak

[57] ABSTRACT

A record-player for continuous play includes, in combination, a center spindle with a drive shaft for supporting record disks to be played in its upper section, a rotary cam for controlling the drive shaft to cause disks to fall down one-by-one to a play station upon completion of playing of one disk and a sensing mechanism for sensing disks not played supported by the center spindle to control the rotary cam.

4 Claims, 7 Drawing Figures

RECORD-PLAYER FOR CONTINUOUS PLAY

BACKGROUND OF THE INVENTION

This invention relates to a record-player for continuous play of the type in which a plurality of record disks are supported on the upper portion of a center spindle of a turntable, are caused to fall down on the turntable one-by-one upon completion of the playing of one disk, and a tone arm is moved to a position above and corresponding to the non-recorded peripheral portion of the record disk in a play station, depending upon the size of the record disk, whereby each disk is properly played successively.

It is an object of the invention to provide a record-player in which record disks are caused to come down one-by-one to play each disk by rotation in either direction and up-down movement of a center spindle mechanism.

It is another object of the invention to provide a record-player of the above type in which the center spindle is controlled by a single rotary cam rotatable periodically.

It is a further object of the invention to provide a record-player of the above type in which an electric circuit is controlled through the rotary cam in response to detection of the record disks to be played.

It is a still further object of the invention to provide a record-player of the above type in which a pick-up needle for reproduction is correctly positioned on the non-recorded peripheral portion of the record disk.

It is another object of the invention to provide a record-player of the above type in which a number of record disks can be properly and conveniently played.

It is still another object of the invention to provide a record-player of the above type for continuous play which is easily manipulated.

SUMMARY OF THE INVENTION

According to the invention, there is provided a record-player for continuous play of a plurality of record disks, which comprises, in combination, a center spindle with a drive shaft for supporting record disks and permitting the disks to fall down one-by-one in response to movement of the drive shaft, a rotary cam with a cam follower for driving the drive shaft to cause the disks to fall down one-by-one to a play station, and control means responsive to detection of the record disks supported on the upper portion of the center spindle for continuing the operation of the rotary cam to play the disks successively.

DESCRIPTION OF THE PREFERRED EMBODIMENT

Figure 1:
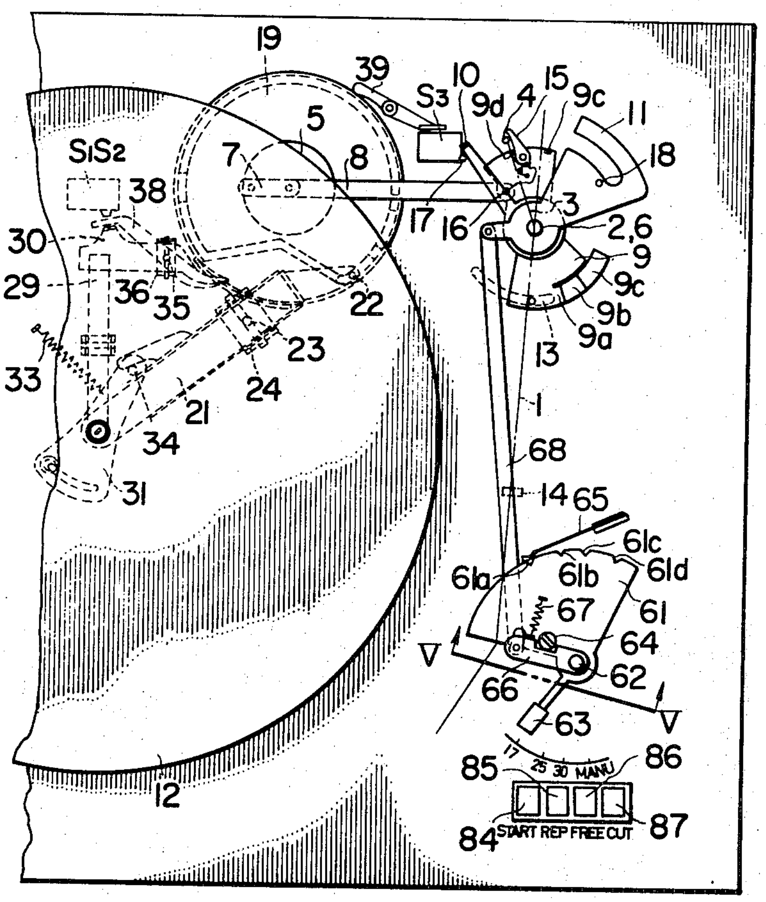
FIG. 1 is a partial plan view of a record-player according to the invention shown in a rest position.

Referring now to FIG. 1, there is shown a one-dot-dash line 1 which is the center line of a tone arm (not shown). The tone arm is provided at its pointed end with a pick-up cartridge and a pick-up needle, and is rotatably supported by a shaft 2. An arm 3 carrying a pin 4 is secured to the shaft 2 and thus is rotatable together with the tone arm 1. A mechanism to move the tone arm in response to rotation of an auxiliary motor 5 is provided and has a shaft 6 lying substantially on the axis of the shaft 2. At this shaft 6, there are supported a slider plate 9 coupled through crank levers 7 and 8 to the auxiliary motor 5 and movable in an oscillatory manner in response to rotation of the auxiliary motor 5, an arm 10 rotatable in conjunction with the slider plate 9 with a braked condition therebetween provided by springs or viscous fluid for moving the tone arm 1 in the direction toward a turntable 12, and a stopper plate 11 abutting upon the arm 10 for restricting rotation of the arm 10 to stop rotation of the tone arm at a position above and corresponding to a non-recorded peripheral portion of a disk.

The slider plate 9 carries an arm lifter 13, and has a cam section for moving vertically the tone arm 1 and a return arm 15 coming into contact with the pin 4 to return the tone arm 1 back onto an arm rest 14. The cam section consists of a higher portion *9a*, an even or intermediate portion *9b*, and lower portion *9c*. The return arm 15 is limited in its rotation by slider plate portions *9d* and *9e*, and is normally urged by a spring 16 in the counterclockwise direction. Owing to the above arrangement, when an unexpected force is applied externally to the tone arm 1 in the clockwise direction while moving, the return arm 15 is pushed in the clockwise direction to thereby prevent the occurrence of damage to any element. There are disposed further a stop pin 17 to limit rotation of the arm 10 and another pin 18 to cause the return arm 15 pushed in the clockwise direction to lift itself. The speed of a drive transfer shaft *5a* (FIG. 2) of the auxiliary motor 5 is reduced by gears and the like to a rate, e.g., of 4 r.p.m., and its rotation is halted once every 180° rotation by an electric circuit and cam mechanism.

Figure 2:
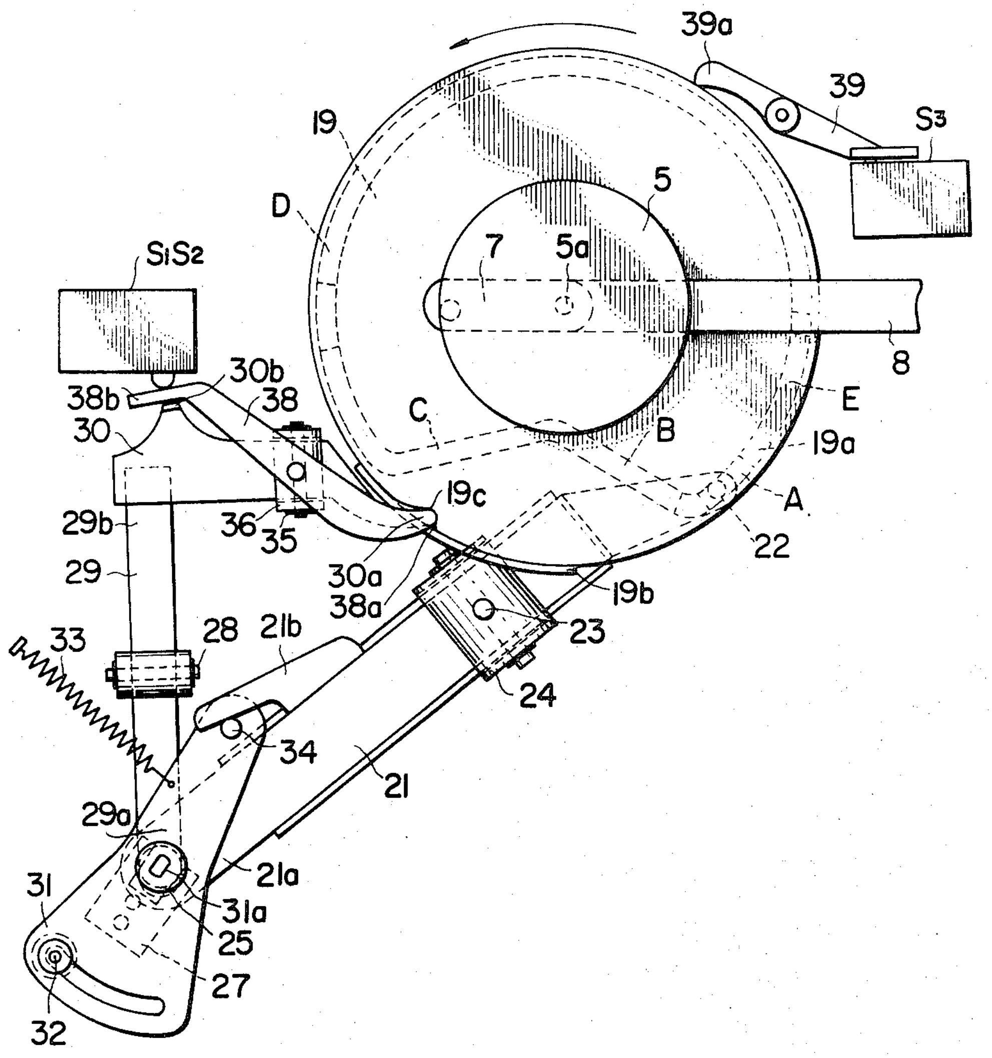
FIG. 2 is a plan view of a control mechanism for a center spindle in the rest position.
Figure 3:
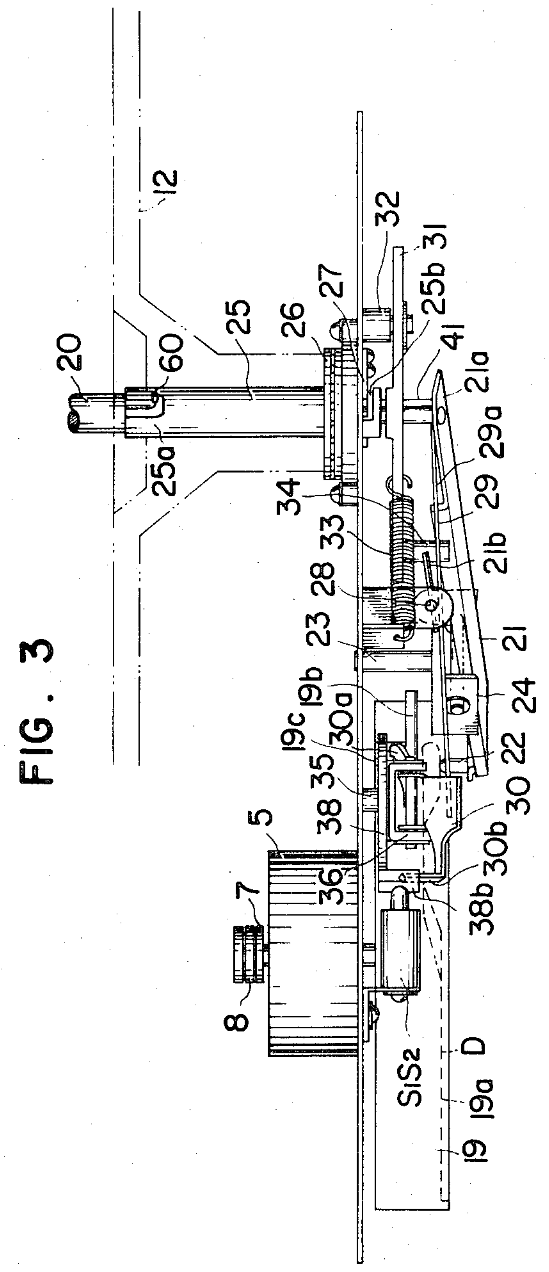
FIG. 3 is a side elevational view of the mechanism shown in FIG. 2.
Figure 4:
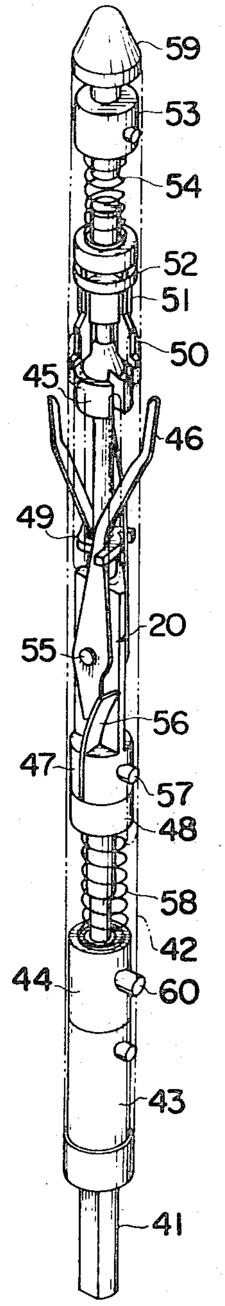
FIG. 4 is a perspective view of the center spindle.
Figure 5:
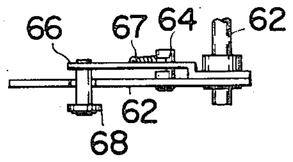
FIG. 5 is a partial cross-sectional view taken substantially along line V—V in FIG. 1, showing a holder plate apparatus.

As shown in FIGS. 1 through 3, the auxiliary motor 5 has on its drive transfer shaft *5a* a rotary cam 19. The rotary cam 19 has a cam groove *19a* for controlling a center spindle 20 through a hereinafter described mechanism to permit the dropping of the disks one-by-one; on its outer periphery, a projecting separation band *19b* to actuate a switch S1 and a change switch S2, depending upon whether there is a disk above the center spindle 20 or not; and, on the upper side of the separation band *19b*, a recess *19c* to open the switch S1 and connect contact S2-0 of the switch S2 to its terminal S2-2 (FIG. 6) when the record-player is in a rest position. The cam groove *19a* of the rotary cam 19 has groove portions A and D which open downwardly and are shallow; groove portions B, C, and E which are deeper than the former; and other portions which have no reference character and are inclined so as to provide a continuous groove path between adjacent groove portions. The cam groove *19a* is formed on the underside of the rotary cam 19 along a circle having a center which accords with the axis of the drive transfer shaft *5a*, except for groove portion B curving inwardly and groove portion C curving outwardly. A pin 22 at the pointed end of a cam follower 21 fits slidably in the cam groove 19*a*. The cam follower 21 is pivoted in a vertically movable manner to a rotary base 24 which is pivoted in a horizontally movable manner to a shaft 23. The other end 21*a* of the cam follower 21 is positioned below a shaft 25 of the turntable 12.

The turntable 12 is supported by a thrust bearing 26 about the shaft 25. The shaft 25 is formed in its upper portion with an L-shaped slit 25*a* and in its lower portion with a cut-away portion 25*b* in which a leaf spring 27 is inserted to receive in a stable manner the center spindle 20 within the shaft 25. One end 29*a* of a sensing lever 29 pivoted to a shaft 28 is disposed on one end 21*a* of the cam follower 21, and the other end 29*b* abuts upon a switching lever 30. Further, around the one end 29*a* of the sensing lever 29, a rotary plate 31 is disposed having a key way 31*a* in which a drive shaft 41 of the center spindle 20, hereinafter described, can fit. The rotary plate 31 is supported by a shaft 32 through its elongated hole and is biased by a spring 33 so that a pin 34 provided at one thereof abuts upon the arm 21*b* of the cam follower 21. The switching lever 30 abutting upon the other end 29*b* of the sensing lever 29 is supported in a vertically movable manner on a rotary base 36 pivoted to a shaft 35 where its pointed end 30*a* abuts the outer periphery of the rotary cam 19 and its bent portion 30*b* abuts a switch actuating lever 38.

The switch actuating lever 38 is pivoted to the shaft 35 and is disposed so that its pointed end 38*a* is in contact with the outer periphery of the rotary cam 19 and the other end 38*b* is facing the switches S1 and S2. At all times, except when the pointed end 38*a* is engaged into the recess 19c of the rotary cam 19, the switch lever 38 causes the switch S1 to close and the switch S2 to be conductive between terminal S2-2 and contact S2-0. Pointed end 39*a* of a switching lever 39 abuts upon the rotary cam 19 and is located so as to oppose the pointed end 38*a* of the switching lever 38 symmetrically about the shaft 5*a*, so that, similar to the switching lever 38, the lever 39 causes terminal S3-1 to be connected to contact S3-0 when its pointed end 39*a* fits in the recess 19*c* while the cam rotates.

The aforementioned cam follower 21 is so designed that its one end 21*a* is heavy and, thus, the pin 22 provided at the other end thereof always fits in the cam groove 19*a*. Similarly, the switching lever 30 is constructed so that the one end having the bent portion 30*b* is heavy so as to push down the other end 29*b* of the sensing lever 29 and, thus, the one end 29*a* is elevated.

In the center spindle 20, the drive shaft 41 is supported by lower bearings 43, 44 and a conical cam 45 in its upper portion which are vertically movable and rotatable in either direction. The bearing 44 is coupled to an outer cylinder 42 by a pin 60 which extends outward and fits in the L-shaped slit of the shaft 25 when the center spindle 20 is inserted inside the shaft 25. To the drive shaft 41 above the bearing 44, a lower pawl control (open-close) cam 49 is coupled which is supported by the upper surface of a lower pawl support 47 carrying three lower pawls 46 serving as a support for disks. The pointed end of the drive shaft 41 is in contact with an upper pawl support 51 carrying three upper pawls 50. The upper pawl support 51 suspends upper pawls 50 by means of a support ring 52 and is always urged downwardly by a spring 54, one end of which is received by a spring stopper 53. It will be noted that the lower pawls 46 are pivoted at points 55 to the lower support 47 and urged by leaf springs 56 so as to open outwardly. The lower pawl support 47 is only vertically movable because a pin 57 is fitted in an elongated hole (shown by a dotted line) formed in the outer cylinder 42. Spring 58 is a weak spring for maintaining the drive shaft 41 at an elevated position, and a head cap 59 is disposed at the top. The distance between the upper pawls 50 and the lower pawls 46 is designed so as to be substantially equal to one and a half of the thickness of one record disk so that, when the upper pawls 50 are caused to open outwardly only the lowermost disk out of a plurality of disks previously supported by the lower pawls 46 is then supported by the lower pawls 46 and the remaining disks are supported by the upper pawls 50.

A holder plate 61 FIG. 1, generally of a sector shape, is pivoted to a shaft 62, which has an adjusting cam 64 and a control knob 63 at an extended portion thereof. The holder plate 61 is formed with notches 61*a*, 61*b* and 61*c* and is engageable with the stopper plate 11 which functions to move the tone arm 1 to a position above and corresponding to the non-recorded peripheral portion of the disk on the turntable. It has further a notch 61*d* formed in the periphery of it, by which the tone arm 1 becomes manually movable. Specifically, one of the notches 61*a*, 61*b* or 61*c* engages the projection of a leaf spring 65 when the disk to be played has the diameter of 17cm, 25cm or 30cm, respectively. The shaft 62 supports pivotably a lever 66 which always abuts the adjusting cam 64 provided on the holder plate 61 by urging of a spring 67. One end of the lever 66 is connected to a lever 68 which is in turn coupled to the stopper plate 11.

Figure 6:
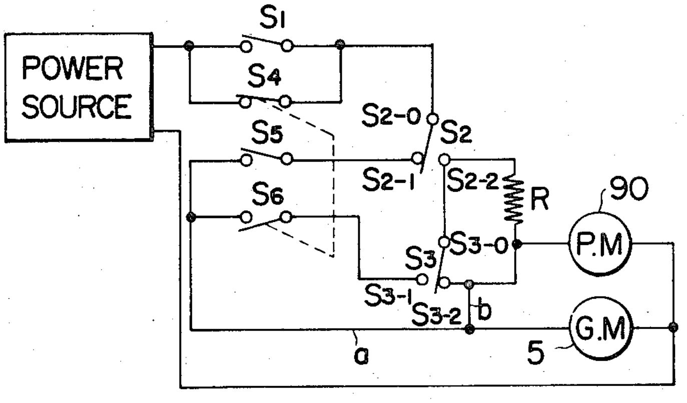
FIG. 6 is a diagram of an electric circuit for actuating the record-player.
Figure 7:
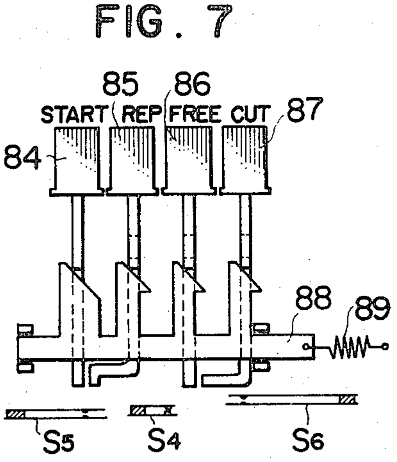
FIG. 7 is a side view of a control button mechanism of the record-player of the present invention.

FIG. 6 shows an electric circuit to actuate the record-player according to the invention, and FIG. 7 shows a switch mechanism to control the record-player from a control panel. Repeat-play "REP" switch button 85, interrupt "FREE" switch button 86, and end-of-play "CUT" switch button 87 may engage, when depressed, with a lock member 88 retracted always by a spring 89. A "START" switch button 84 does not engage with the lock member 88 and releases the above three switch buttons from engagement with the lock member 88 when depressed. The start switch button 84 and the repeat-play switch button 85 act to close a switch S5 of the electric circuit hereinafter described, the end-of-play switch button 86 acts to open a switch S4, and the interrupt switch button 87 acts as to open the switch S4 and close a switch S6.

In FIG. 6, the switch S1 and switch S4 are connected together in parallel and serially connected to the change switch S2. The switch S4 is normally closed. The switch S1 and the change switch S2 are turned over together by the switching lever 38 abutting upon the rotary cam 19. Specifically, the switch S1 is in the open position and the change switch S2 is conductive between terminal S2-1 and contact S2-0 when the end 38*a* of the switching lever 38 is fitted in the recess 19*c* of the rotary cam 19. The terminal S2-1 of the switch S2 is connected through the normally open switch S5 and the normally open switch S6 to terminal S3-1 of the change switch S3 and also from the switch S5 through conductor *a* to the auxiliary motor 5. There is a loop circuit formed from terminal S2-2 of the change switch S2, through contact S3-0 and terminal S3-2 of the change switch S3 and a voltage limiting resistor R, to that terminal S2-2. The junction point between terminal S3-2 and the resistor R is connected to a main motor 90 for driving the turntable. Conductor *a* is also coupled through conductor *b* to terminal S3-2 of the change switch S3. Other terminals of the main motor 90 and the auxiliary motor 5 are coupled to the opposite polarity terminal of the power source. It should be noted that terminal S3-2 of the change switch S3 is coupled to contact S3-0 when the switching lever 39 shown in FIG. 2 is depressed.

Now the assembling and operation of the aforedescribed record-player will be explained. First, the center spindle 20 is inserted in the shaft 25 of the turntable 12 and the pin 60 is fitted in the L-shaped slit formed in the shaft 25. Then, the center spindle 20 is rotated to cause the pin 60 to engage the raised portion in the leading end of the L-shaped slit. As a result, since the leaf spring 27 abuts the outer cylinder 42 of the center spindle 20 to urge the same upwardly, the spindle 20 is stably received by the L-shaped slit. In the rest state, as shown in FIG. 2, the pin 22 of the cam follower 21 is positioned at the shallow portion A in the cam groove 19*a* of the rotary cam 19, so that the other end 21*a* is elevated and the drive shaft 41 of the center spindle 20 is pushed upwardly. Accordingly, the lower pawls 46 of the center spindle are open, and the upper pawls 50 are elevated to abut upon the margin of holes of the outer cylinder and, thus, are closed. Then, if a desired number of disks to be played are disposed on the center spindle, these disks are all received and supported by the lower pawls 46. Next, the holder plate 61 is rotated through the knob 63 in such a way that one of notches 61*a*, 61*b* and 61*c* corresponding to the size (17cm, 25cm, or 30cm) of the disk engages the leaf spring 65 at its end.

If it is desired to operate the tone arm 1 manually, the notch 61*d* is caused to engage the leaf spring 65, whereby the stopper plate 11 is located very close to the arm 10. In this position, if the start switch button 84 is depressed, the switch S5 is closed and the main motor 90 and the auxiliary motor 5 start to rotate, so that the turntable 12 and the rotary cam 19 start to rotate. As the rotary cam 19 rotates, the pointed ends of the switching lever 38 and the change lever 30 come out of the recess 19*c* of the outer periphery to thereby close the switch S1 and connect contact S2-0 to terminal S2-2 of the switch S2. Upon further rotation of the rotary cam 19, the pin 22 of the cam follower 21 moves from portion A to portion B of the cam groove 19*a*, the one end 21*a* of the cam follower 21 lowers and the drive shaft 41 of the center spindle 20 also lowers, the upper pawls 50 slide down along the surface of the conical cam 45 and open outwardly of the outer cylinder 42. As a result, because the distance between the upper pawls 50 and the lower pawls 46 is selected to be substantially equal to one and a half times the thickness of one disk, all the disks except for the lowermost disk are supported by the upper pawls 50, and the lower pawls 46 move down by the weight of the lowermost disk while resisting the force of the spring 58 to thereby push down the one end 29*a* of the sensing lever 29 through the drive shaft 41. As the rotary cam 19 rotates further, the pin 22 moves over portion B of the cam groove, so that the cam follower 21 rotates in the counterclockwise direction about the shaft 23 to thereby rotate the drive shaft 41 fitted in the rotary plate 31 in the clockwise direction through the arm 21*b* of the cam follower 21, the pin 34 and the rotary plate 31. In response to rotation of the drive shaft 41, the pawl control cam 49 rotates the lower pawls 46 in the same direction while resisting the urging force of the leaf springs 56 to thereby shut the lower pawls, whereby the disk supported by the lower pawls 46 is allowed to fall down onto the turntable. Thereafter, as the pin 22 of the cam follower 21 moves over portion C of the cam groove 19*a*, the drive shaft 41 of the center spindle 20 is rotated in the counterclockwise direction to thereby open the lower pawls 46. As the pin 22 moves to portion D, the drive shaft 41 is again elevated, so that the disks then held in the upper section of the center spindle 20 are now supported by the lower pawls 46. When the rotary cam 19 has rotated through an angle of about 180°, the one end 39*a* of the switching lever 39 fits in the recess 19*c* of the rotary cam 19 to open the circuit between terminal S3-2 and contact S3-0 of the switch S3 and connect contact S3-0 to terminal S3-1, so that the auxiliary motor 5 is stopped and the main motor 90 is supplied with electric power from the power source through the voltage limiting resistor R. According to the above circuit arrangement of the limiting resistor R, the level of noise generated by the main motor 90 during the playing can be decreased. It should be noted that the resistor R is selected to slightly reduce the voltage level supplied to the main motor after the start thereof to decrease noise generation without a reduction of the speed.

The arm 10, rotated in the clockwise direction together with the slider plate 9 in response to continued rotation of the auxiliary motor 5, pushes the pin 4 of the arm 3 secured to the rotary shaft 2 of the tone arm 1 to thereby rotate the tone arm 1 toward the turntable 12. Then, the tone arm 1 is stopped at the position where the arm 10 abuts upon the stopper plate 11 which is positioned in a place determined by the aforedescribed selecting mechanism, that is, it is stopped at the position above and corresponding to the non-recorded peripheral portion of the disk to be played. In response to further rotation of the auxiliary motor 5, the slider plate 9 rotates, and, when the arm lifter 13 slides along the inclined portion 9*b* of the cam section and then the lower portion 9*c* thereof, the tone arm moves down slowly, whereby the pick-up unit rests directly on the disk so that the record-player is ready to play. Where the pick-up needle of the tone arm 1 does not position exactly in the non-recorded peripheral portion of the disk, this trouble can be eliminated by rotating the eccentric adjusting cam 64 provided on the holder plate 61 to adjust displacement of the relative position between the holder plate 61 and the stopper plate 11.

When the playing of one disk is completed, a detecting mechanism (not shown) for detecting the end of play closes the switch S6, or, when the playing is manually interrupted during play, the switch S6 is caused to close by depressing the end-of-play switch button 87, so that the auxiliary motor 5 is restarted. It should be noted that the end of play switch button 87 functions similarly to the case where the playing has terminated with a short span depression thereof resulting in no engagement with the lock member 88. If the switch button 87 is depressed deeply into engagement with the lock member 88, the instant record-player stops, even if one or more disks remain unplayed in the upper section about the center spindle 20, after the return of the tone arm 1 onto the arm rest 14. The reason is because the switch S4 is opened. If the switch S6 is closed and the auxiliary motor 5 is restarted, in response to reverse rotation of the slider plate 9, the arm lifter 13 is moved up by the cam section, so that the pick-up needle rises from the disk, the return arm 15 on the slider plate 9 pushes the pin 4 of the arm 3, and the tone arm 1 is turned back onto the arm rest 14. It will be noted that the arm 10 rotates together with the slider plate 9 and is stopped by the stop pin 17 whereby it returns to the rest state.

In response to continued rotation of the auxiliary motor 5, the rotary cam 19 rotates together therewith, the pin 22 of the cam follower 21 moves from the cam groove portion D of the cam groove 19*a* to the groove portion E. At this position, the one end 21*a* of the cam follower 21 falls down. The pointed end 38*a* of the switching lever 38 and the pointed end 30*a* of the change lever 30 locate about the projecting separation band 19*b* of the rotary cam 19 and forward of the same with respect to the rotating direction of the rotary cam. Therefore, the other end of the change lever 30 lowers and the sensing lever 29 disposed below the lever 30 pivots about the shaft 28 to raise its one end 29*a*. If one or more disks are supported in the upper section of the center spindle 20 by the lower pawls 46, the drive shaft 41 moves down again by the weight of the remaining disks when the pin of the cam follower 21 comes to the groove portion E of the cam groove 19*a*, so that the lowermost disk is separated from the remainder which are now supported by the upper pawls 50. Owing to the downward movement of the drive shaft 41, the one end 29*a* of the sensing lever 29 is pushed downwardly, whereby the one end of the change lever 30 is moved upwardly and the other end 30*a* comes down. Also, owing to rotation of the rotary cam 19 the end 30*a* of the change lever 30 is positioned below the separation band 19*b*. Then, when the pin 22 of the cam follower 21 is moved onto the groove portion A of the cam groove 19*a*, the drive shaft 41 is pushed upwardly and assumes the position shown in FIG. 2. However, because there is no recess corresponding to the recess 19*c* on the underside of the separation band 19*b* of the rotary cam 19, the other end 38*b* abuts upon the projection 30*b* so that the lever 38 cannot rotate about the shaft 35. Thus, the switches S1 and S2 do not change their positions, thereby effecting the same operation as that noted above to play the next disk.

In case the last disk has been played and there is no disk in the upper section about the center spindle 20, the drive shaft 41 of the center spindle 20 does not come down when the pin 22 of the cam follower 21 comes onto the groove portion E of the cam groove 19*a*, so that the one end 30*a* of the change lever 30 locates above the separation band 19*b* as a result of continued rotation of the rotary cam 19, and, when the rotary cam 19 recovers to the rest position shown in FIG. 2 after one rotation, the recess 19*c* receives the one end 30*a* of the change lever 30 and the one end 38*a* of the switching lever 38, whereby the switch S1 is opened and terminal S2-1 of the switch S2 is connected to its contact S2-0, resulting in stoppage of the record-player.

If the repeat-play switch button 85 is depressed already, only the last disk out of the stacked disks is played repeatedly. If the end-of-play switch button 86 is depressed; the rotation of the disk is stopped when the playing of the disk then on the turntable is ended.

As is apparent from the foregoing description, the present invention is characterized in that it operates very precisely because the center spindle and the switch mechanism are controlled and manipulated by the single rotary cam; it is easily changed from one operating condition to another condition because the electric circuit is switched by the separation band and the recess provided in the peripheral portion of the rotary cam in response to detection of the disks to be played by means of the detecting mechanism having no force applied thereto; and it locates the pick-up needle of the tone arm precisely in the non-recorded peripheral portion of the record disk because of use of the eccentric adjusting member. Further, the present invention includes the repeat-play switch button, the end-of-play switch button, and the interrupt switch button, whereby the operation of the record-player can be easily changed to the state of playing repeatedly the record disk, stopping the record-player after the playing of the disk is terminated on the turntable, interrupting playing thereof and starting playing of the next disk, stopping the automatic operation after returning the tone arm to the rest position, or permitting manual manipulation.

What is claimed is:

1. A record-player for continuous play, comprising, in combination:

a turntable rotatably supported on a center shaft and driven by a main motor, a center spindle having a movable drive shaft therein, the spindle held on said center shaft and being capable of supporting disks on an upper portion thereof and permitting the disks to fall one-by-one in response to vertical movement and forward-reverse rotational movement of the drive shaft therein, upper and lower movable pawls carried by the center spindle, the upper pawls movable to open or closed position by upward-downward vertical movement of the drive shaft, and the lower pawls move to open or closed position by the forward-reverse rotary movement of the drive shaft, operating means for moving the drive shaft for both vertical and rotary movement, the operating means including a rotary cam for driving the drive shaft to cause the disks to fall one- by - one on the turntable, transmitting means with a cam follower for connecting the rotary cam to said drive shaft for the center spindle, and driving means for rotating the rotary cam, the cam follower being pivotally rotatable on vertical and horizontal axes for moving the drive shaft vertically and rotatably, said cam rotating said cam follower about the vertical axis to cause the forward-reverse rotational movement of the drive shaft and about the horizontal axis to cause the vertical movement of the drive shaft.

2. A record-player as defined in claim 1 wherein the driving means includes an auxiliary motor.

3. A record-player as defined in claim 1 wherein the center spindle is removable from the center shaft.

4. A record-player as defined in claim 1 wherein the center spindle comprises an outer cylinder surrounding the drive shaft, the outer cylinder including windows permitting the upper and lower pawls to project there-from, the drive shaft mounted to move vertically in the outer cylinder and rotate in either direction in response to operation of the operating means, a lower pawl support mounted on the drive shaft, the lower pawl support being keyed to the outer cylinder to allow vertical movement relative thereto, but prevent relative rotational movement, the lower pawls being pivotally connected to the lower pawl support, means cooperating with the lower pawl support for biasing the lower pawls to the open position, a first cam engaged with the drive shaft and engageable with the lower pawls to move them to a closed position in response to rotation of the drive shaft, an upper pawl support mounted on the drive shaft, means for biasing the upper pawl support in a downward direction, a second cam fixed to the outer cylinder below the upper pawl support, the upper pawls being mounted on the upper pawl support and movable to an open position by engagement with the second cam when the drive shaft moves downwardly and the upper pawl support is in its lower position, the upper pawls being movable to a closed position by engagement with the outer cylinder when the drive shaft is moved upwardly and the upper pawl support is in its upper position, the upper and lower pawls being projected through the windows in the outer cylinder.

* * * * *